United States Patent
Fujimori

[15] 3,672,158
[45] June 27, 1972

[54] SYNTHETIC RESIN WATCHCASE WITH EMBEDDED METAL REINFORCEMENT

[72] Inventor: Yoshiaki Fujimori, Suwa, Japan
[73] Assignee: Kabushiki Kaisha Suwa Seikosha, Tokyo, Japan
[22] Filed: Nov. 30, 1971
[21] Appl. No.: 203,393

[52] U.S. Cl. ..........................................58/90 R
[51] Int. Cl. ............................................G04b 37/08
[58] Field of Search ..................................58/88, 90, 91, 92

[56] References Cited

UNITED STATES PATENTS 2,720,748  10/1955  Gisiger ..........................58/90 R X

FOREIGN PATENTS OR APPLICATIONS 273,737   2/1951   Switzerland ..........................58/90 R
393,195  10/1965   Switzerland ..........................58/90 R Primary Examiner—Richard B. Wilkinson
Assistant Examiner—George H. Miller, Jr.
Attorney—Alex Friedman et al.

[57] ABSTRACT

In a watchcase wherein the case-body is made of a synthetic resin, a long-lasting water-proof seal between the synthetic resin case and the glass face is ensured by means of a metal reinforcing ring embedded in the synthetic resin. The reinforcing ring is suitably perforated so that synthetic resin flows into the perforations during the molding operation and locks the reinforcing ring in place permanently.

3 Claims, 4 Drawing Figures 3,672,158

SYNTHETIC RESIN WATCHCASE WITH EMBEDDED METAL REINFORCEMENT

BACKGROUND OF THE INVENTION

The use of synthetic resin as the structural material for watchcases brings with it a number of significant advantages over the metals which have previously been used. The resin is lighter than the metals, offers a wide choice of colors which completely permeate the resin so that scratches are virtually unnoticeable and is simple to fabricate, especially by injection molding.

However, synthetic resins suffer from the disadvantage that they tend to cold-flow so that the seal between a synthetic resin watchcase and the glass face tends to deteriorate with the passage of time. In order to overcome this difficulty it has been the practice to surround the join between the synthetic resin and the watch face with an external glass ring. The difficulty here is that glass is not strong in tension so that security is achieved only at the cost of using an undesirably thick and heavy glass ring.

SUMMARY OF THE INVENTION

A metal ring of L-shaped cross section is embedded in a synthetic resin watchcase. The resin of the watchcase envelops the vertical arm of the reinforcing ring and lies between the vertical arm and the glass face of the watch. The vertical leg of the reinforcing rinG prevents cold-flow of the resin away from the watch-glass, thereby ensuring a permanent water-proof seal between the watch-glass and the case-body.

The horizontal arm of the reinforcing ring is perforated and the perforations are filled with synthetic resin durinG the molding operation by which the watchcase is formed. The penetration of the reinforcing ring by the synthetic resin locks the reinforcing ring in place within the synthetic resin watchcase permanently.

Accordingly, an object of the present invention is to provide a synthetic resin watchcase which is lighter in weight than metal watchcases, which affords a greater range of colors and is less expensive to manufacture.

Another object of the present invention is to provide a synthetic resin watchcase which affords a non-deteriorating water-proof seal to a glass face.

A further object of the invention is to provide a synthetic resin watchcase which is permanently reinforced by an embedded metal reinforcing ring.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

BRIEF DESCRIPTION OF THE PREFERRED EMBODIMENTS

Figure 1:
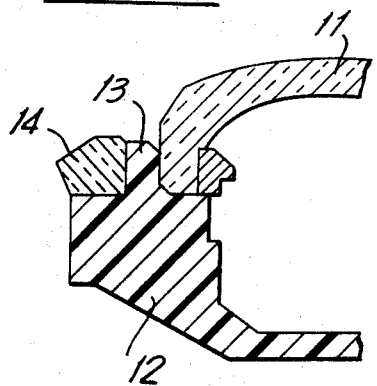
FIG. 1 is a partial sectional elevational view of a synthetic resin watchcase in accordance with the prior art.
Figure 2:
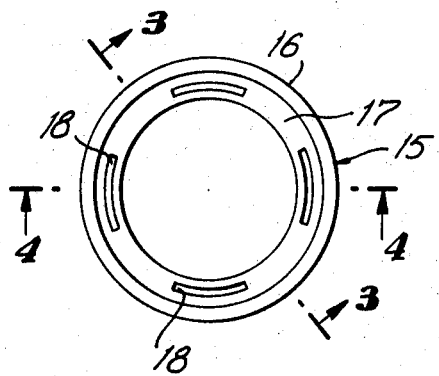
FIG. 2 is a plan view of a reinforcing ring for use in a synthetic resin watchcase in accordance with the present invention.

In a water-proof watchcase, it is necessary that a tight seal be established between the watch-glass and the case-body. Where the case-body is made of a deformable synthetic resin, a temporarily satisfactory seal can be established by pressing the watch-glass into a corresponding depression in the synthetic resin cover. However, due to the fact that synthetic resin tends to cold-flow, steps must be taken to prevent deterioration of the seal by reason of such flow. The conventional way of coping with this matter is shown in FIG. 1 where watch-glass 11 is pressed into a depression in case-body 12 and the seal is established between ridge 13 and the watch-glass 11. To prevent cold-flow, a glass ring 14 encircles the ridge 13. Unfortunately, however, glass is not strong in tension; consequently it becomes necessary to make the glass ring relatively thick and consequently relatively heavy. The weight and size are both objectionable since they interfere with the comfort of the wearer and make the watch unnecessarily bulky.

To eliminate the requirement for a glass compression ring, a reinforcing ring 15 which is L-shaped in cross section is embedded in the synthetic resin watchcase during the molding operation. The reinforcing ring has a rim 16, a horizontal arm 17 and perforations 18 within the horizontal arm 17.

Figure 3:
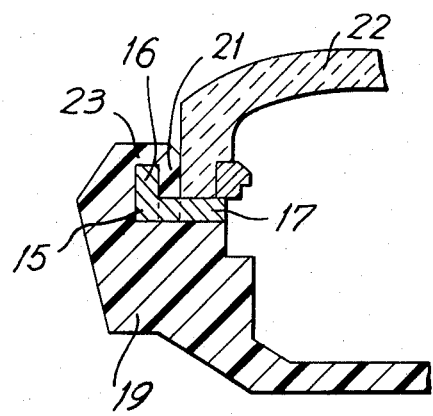
FIG. 3 is a partial sectional view of a synthetic resin watchcase in accordance with the present invention in which the section through the reinforcing ring of FIG. 2 is taken along line 3—3 of FIG. 2.

FIG. 3 shows how the reinforcing ring 15 is embedded in Synthetic resin watchcase 19. Vertical rim 16 holds synthetic resin skirt 21 against watch-glass 22. Skirt 21 is connected to the body of the watchcase by means of roof 23. A portion of horizontal arm 17 may be left uncovered with resin so that watch-glass 22 may seat thereon.

Figure 4:
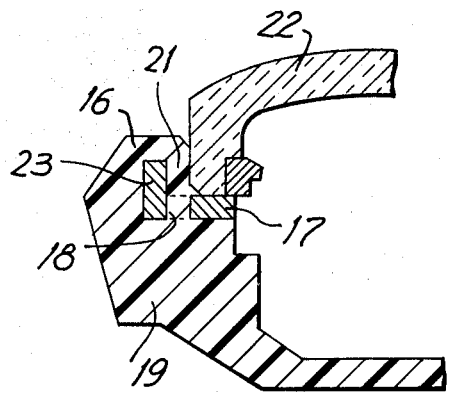
FIG. 4 is a partial sectional view similar to that of FIG. 3 but taken along line 4—4 of FIG. 2.

Connection between skirt 21 and case-body 19 is also made through perforation 18 as shown in FIG. 4. The connection of skirt 21 through perforation 18 with case-body 19 further decreases the tendency to cold-flow, as a result of which the seal between watch-glass 22 and case-body 19 is rendered permanent.

Since the reinforcing ring 15 is molded into the case-body 19 the problem of providing great precision in the manufacture of the case-body does not arise. The watch-glass 22 seats on horizontal leg 17 of the reinforcing ring 15 and contact with skirt 21 takes place automatically as the watch-glass 22 is seated. This is in sharp contrast to the situation which obtains in constructions according to the prior art where the glass ring must be made with great precision and the outer surface of ridge 13 must be made with equal precision, else the tension force generated in the external glass ring may be sufficient to cause breakage. Needless to say, the fact that the exterior glass ring is in tension already makes it additionally susceptible to fracture by accidental shock. These problems do not arise in the constructions in accordance with the present invention since the reinforcing ring is made of metal, and is buried in a flexible, deformable synthetic resin body.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A water-proof watchcase comprising a case-body of synthetic resin, a metallic annular ring of L-shaped cross-section embedded in said synthetic resin and a watch-glass concentric with said ring and firmly contacting said synthetic resin internally to said ring in a water-proof seal, whereby said ring prevents flow of said synthetic resin under the outward radial pressure of said watch-glass and maintains thereby the effectiveness of said seal between said resin and said watch-glass.

2. A water-proof watchcase as defined in claim 1, wherein the horizontal arm of said L-shaped ring is perforated at at least one location and said synthetic resin within said perforation serves to lock said ring within said synthetic resin casebody.

3. A water-proof watchcase as defined in claim 1, wherein said watch-glass is seated upon said horizontal arm of said ring.

* * * * *